Patented Jan. 26, 1954

2,667,445

UNITED STATES PATENT OFFICE 2,667,445

PRODUCTION OF RIBOFLAVIN BY ASHBYA GOSSYPII WITH COBALT AS ADDITIVE

Richard J. Hickey, Terre Haute, Ind., assignor to Commercial Solvents Corporation, Terre Haute, Ind., a corporation of Maryland No Drawing. Application August 5, 1949, Serial No. 108,861

3 Claims. (Cl. 195—114)

My invention relates to the production of riboflavin and more specifically to a method for enhancing the yields of riboflavin produced by propagation of the organism Ashbya gossypii on nutrient media containing limited amounts of cobalt.

The production of riboflavin by the fermentation of nutrient mashes with the yeast Ashbya gossypii (also known as Nematospora gossypii) has been disclosed in U. S. Patent No. 2,445,128, granted July 13, 1948, to Fred W. Tanner, Jr. et al. According to this patent yields of 300 to 400 micrograms of riboflavin per ml. of culture liquor are produced by cultivating Ashbya gossypii under aerobic conditions in a growth medium comprising 0.5 to 10.0% fermentable carbohydrates, a proteinaceous material, and a lipid. Examples of fermentable carbohydrates include glucose, sucrose, maltose and the like. Examples of proteinaceous materials include substances such as corn steep liquor, peptone, yeast and yeast products, distillers by-products, liver residues, animal tankage and other plant and animal proteinaceous substances some of which include the desired factors in bound form which factors must be released by treatment with acids, alkalis, enzymes, or combinations of such agents. Lipids such as corn oil and the like may be used.

In addition to the basic elements enumerated above, inorganic salts such as calcium carbonate, calcium chloride, monopotassium phosphate and trace elements such as copper, iron, manganese, and zinc are also usually added to the medium in small quantities unless already present in sufficient quantities in one or more of the other ingredients of the medium.

The previously sterilized and inoculated medium is permitted to ferment at a temperature ranging from 15 to 40° C. and preferably between 24 and 30° C. while aerating the mash, preferably by introducing sterile air through spargers or other suitable devices located in the bottoms of the fermenters. The pH of the mash at the time of inoculation should be within the range 4.0 and 8.0 and preferably between 5.0 and 7.5.

I have now discovered a means whereby the yields of riboflavin produced by the fermentations of nutrient media with the organism Ashbya gossypii under the conditions described above can be materially increased. I accomplish this by incorporating in the nutrient media of the type ordinarily fermentable by Ashbya gossypii limited amounts of cobalt. This is most conveniently accomplished by adding to the fermentation medium a solution of colloidal cobalt or any water-soluble cobalt salt the anions of which are non-toxic to Ashbya gossypii. Insoluble forms of cobalt can be used but less satisfactorily due to the difficulty of obtaining satisfactory dispersions of the small quantities of cobalt throughout the fermentation medium. Suitable forms of cobalt include such materials as the acetate, nitrate, chloride, sulfate, hydroxide, or oxide of cobalt. Where the material used is water soluble, it is desirable, of course, to add the material to the fermentation medium in the form of an aqueous solution so as to obtain more complete and more rapid dispersion of the cobalt through the medium.

The amount of cobalt which I have found gives a stimulatory effect on the production of riboflavin, when used in media for fermentation by Ashbya gossypii, in general ranges from 1 to 30 micrograms per milliliter of medium. The amounts required to give optimum results, however, will vary somewhat depending upon the character of fermentation medium employed, the length of the fermentation and other such factors. In some cases the production of riboflavin is inhibited instead of stimulated when in excess of 20 micrograms of cobalt per milliliter of medium are employed, whereas with other types of media, decided stimulatory effects are produced when using up to 30 micrograms per milliliter. I have found in general, however, that best results are obtained when using 5 to 10 micrograms of cobalt per milliliter.

The effect on riboflavin production of the incorporation of varying amounts of cobalt in fermentation media of various types is shown in the following examples.

EXAMPLE I

A series of 1 liter flasks each containing 150 milliliters of a fermentation medium composed of 2% cerelose, 0.7% peptone and 1% dried wheat fermentation slop was prepared and the pH adjusted to 6.8. Varying amounts of cobalt in the form of cobalt nitrate were added to these flasks, the contents sterilized and the medium in each flask inoculated with about 1 ml. of a 48 hour culture of the organism Ashbya gossypii cultivated on the same type of media. The flasks were then incubated at 28° C. for 5 days with agitation and aeration. The results obtained are shown in Table I.

Table I

| Amt. of Cobalt added, micrograms/ml. | Riboflavin produced, micrograms/ml. | |
|---|---|---|
|  | 3 days | 5 days |
| 0 | 265 | 380 |
| 1 | 340 | 470 |
| 2 | 370 | 495 |
| 5 | 408 | 575 |
| 10 | 425 | 595 |
| 20 | 355 | 540 |
| 30 | 275 | 405 |
| 50 | 125 | 105 |

EXAMPLE II

A series of flasks each containing 150 cc. of sterile medium containing varying amounts of cobalt in the form of cobalt nitrate and having the following composition with the pH adjusted to 6.5 was prepared: 2.5% cerelose, 0.5% corn steep liquor, 0.25% beef stick, 0.25% N-Z amine A (a commercial casein hydrolysate), 0.1% yeast extract. The medium in each flask was inoculated with about 1 ml. of a second generation 24 hour culture of the organism *Ashbya gossypii* which had been cultivated on the fermentation medium shown in Example I. The flasks were then incubated at 28° C. for 7 days with agitation and aeration. The results obtained are shown in Table II.

Table II

| Amt. of Cobalt, micrograms/ml. | Riboflavin produced, micrograms/ml. | | |
|---|---|---|---|
|  | 3 days | 5 days | 7 days |
| 0 | 305 | 560 | 580 |
| 2 |  | 590 | 595 |
| 5 | 320 | 685 | 750 |
| 10 | 310 | 650 | 715 |

EXAMPLE III

A series of flasks each containing 200 ml. of a fermentation medium of the following composition, together with varying quantities of cobalt in the form of cobalt nitrate and with the pH adjusted to 6.5 was prepared: 2.5% cerelose, 0.3% corn steep solids, 0.25% beef stick, 0.25% N-Z amine A (a commercial casein hydrolysate), and 0.1% yeast extract. After sterilization, the contents of each flask were inoculated with about 1 ml. of the culture of the organism *Ashbya gossypii* grown on a liquid medium containing corn steep liquor, N-Z amine A and beef stick. The flasks were then incubated at 28° C. for 7 days with agitation and aeration. The results are shown in Table III below.

Table III

| Amt. of Cobalt, micrograms/ml. | Riboflavin produced, micrograms/ml. | | |
|---|---|---|---|
|  | 3 days | 5 days | 7 days |
| 0 | 310 | 620 | 490 |
| 5 | 400 | 670 | 550 |
| 10 | 280 | 630 | 530 |
| 15 | 230 | 580 | 570 |

EXAMPLE IV

A series of one liter flasks each containing 150 ml. of fermentation medium together with varying amounts of cobalt in the form of cobalt nitrate was prepared having the following composition with the pH adjusted to 6.8: 1.8% glucose, 0.7% peptone, and 1% dried wheat distillery slop. After sterilization, the contents of each flask were inoculated with about 1 ml. of a culture of the organism *Ashbya gossypii*. The flasks were then incubated at 28° C. for 5 days with agitation and aeration. The results are shown in Table IV.

Table IV

| Amt. of Cobalt, micrograms/ml. | Riboflavin produced, micrograms/ml. | |
|---|---|---|
|  | 2 days | 5 days |
| 0 | 170 | 270 |
| 20 | 245 | 300 |
| 50 | 280 | 370 |

It is to be understood that any equivalents or changes which would occur to one skilled in the art are to be considered as lying within the scope of my disclosure and claims.

What I claim is:

1. In a process for the production of riboflavin by the propagation of the organism *Ashbya gossypii* in nutrient media, the improvement which comprises propagating said organism under aerobic conditions in a nutrient medium containing from 1 microgram to 20 micrograms of cobalt per milliliter of medium in addition to any cobalt normally present in the constituents of the said medium.

2. In a process for the production of riboflavin by the propagation of the organism *Ashbya gossypii* in nutrient media, the improvement which comprises propagating said organism under aerobic conditions in a nutrient medium to which has been added from 1 to 20 micrograms of cobalt per milliliter of media in addition to any cobalt normally present in the constituents of the said media.

3. In a process for the production of riboflavin by the propagation of the organism *Ashbya gossypii* in nutrient media comprising a fermentable carbohydrate and proteinaceous material the improvement which comprises propagating said organism under aerobic conditions in the presence of 1 to 20 micrograms of cobalt per milliliter of fermentation medium in addition to any cobalt normally present in the constituents of the said medium.

RICHARD J. HICKEY.

References Cited in the file of this patent

UNITED STATES PATENTS

| Number | Name | Date |
|---|---|---|
| 2,326,425 | Arzberger | Aug. 10, 1943 |
| 2,445,128 | Tanner | July 13, 1948 |
| 2,595,499 | Wood et al. | May 6, 1952 |

OTHER REFERENCES

Foster et al.: The Botanical Review, vol 4, April 1939; pages 207–11.

Jacobs: The Chemistry and Technology of Food and Food Products, 1944, vol 1, Interscience Pub. Inc.; pages 270–626. Book 95.

Porter: Bacterial Chemistry and Physiology, 1946, John Wiley & Sons, New York, pages 621, 627, 629.

Wickersham et al.: Arch. of Biochem., 9, 1, pages 95–98.

Rickes et al.: Science 108, December 3, 1948, pages 634–635.

Skinner: Henrici's Molds, Yeasts and Actinomycetes, 1947, John Wiley & Sons, New York, page 218. Book 530.

Shine: Jour. Am. Chem. Soc. 70, pages 2614, 2615.